United States Patent [19]

Tajima et al.

[11] Patent Number: 5,200,792
[45] Date of Patent: Apr. 6, 1993

[54] DEVICE FOR OBTAINING DISTANCE INFORMATION FROM AN OBJECT BY INSTANTANEOUSLY ILLUMINATING THE OBJECT BY A LIGHT BEAM

[75] Inventors: Johji Tajima; Shizuo Sakamoto, both of Tokyo, Japan

[73] Assignee: NEC Corporation, Tokyo, Japan

[21] Appl. No.: 853,845

[22] Filed: Mar. 19, 1992

Related U.S. Application Data

[63] Continuation of Ser. No. 574,678, Aug. 30, 1990, abandoned.

[30] Foreign Application Priority Data

Aug. 31, 1989 [JP] Japan ................................ 1-222994

[51] Int. Cl.$^5$ .......................... G01C 3/00; G01C 3/08; H04N 7/00; H04N 7/18
[52] U.S. Cl. .......................................... 356/1; 356/4; 358/95; 358/107
[58] Field of Search ...................... 356/1, 4, 5; 358/95, 358/107

[56] References Cited

U.S. PATENT DOCUMENTS

| | | | |
|---|---|---|---|
| 3,902,803 | 9/1975 | Lego | 358/95 |
| 4,727,259 | 2/1988 | Halvis . | |
| 4,834,531 | 5/1989 | Ward | 358/107 |
| 4,862,257 | 8/1989 | Ulich | 358/95 |
| 4,864,395 | 9/1989 | Tajima | 358/107 |
| 4,878,754 | 11/1989 | Homma et al. | 356/1 |
| 4,893,922 | 1/1990 | Eichweber | 358/107 |
| 4,915,498 | 4/1990 | Malek | 358/95 |
| 4,934,810 | 6/1990 | Nagele et al. | 356/1 |

FOREIGN PATENT DOCUMENTS

0302512A2 2/1989 European Pat. Off. .

OTHER PUBLICATIONS

Tajima, "Rainbow Range Finder Principle for Range Data Acquisition", in International Workshop on Industrial Application of Machine Vision and Machine Intelligence held by IEEE in 1987, pp. 381-386.

*Primary Examiner*—Stephen C. Buczinski
*Attorney, Agent, or Firm*—Foley & Lardner

[57] ABSTRACT

For obtaining distance information between an image pickup device (10) and an object (11) illuminated by a monochromatic beam selected by a diffraction grating (18) from an optical beam generated by an optical beam generator (27), a distance information obtaining device comprises an activating device (33) for simultaneously activating the beam generator and the image pickup device a predetermined time duration so that the optical beam generator generates an optical beam while activated and so that the image pickup device picks up an optical image of the object to produce a picture signal while activated. A processing unit (21) processes the picture signal into a processed signal representative of the distance information. The optical beam may have an intensity which is higher that that of environmental light of the object. The predetermined time duration may be an instantaneous time duration. The beam generator may generate a flash of light as the optical beam. Alternatively, the beam generator may comprise a light source for generating a white light as the optical beam and a light source shutter for supplying the white light to the diffraction grating only when the light source shutter is activated. As a further alternative, the image pickup device may comprise a television camera and a pickup shutter for supplying the optical image of the object of the camera only when the pickup shutter is activated.

6 Claims, 6 Drawing Sheets

DEVICE FOR OBTAINING DISTANCE INFORMATION FROM AN OBJECT BY INSTANTANEOUSLY ILLUMINATING THE OBJECT BY A LIGHT BEAM

This application is a continuation of application Ser. No. 07/574,678, filed Aug. 30, 1990, now abandoned.

BACKGROUND OF THE INVENTION

This invention relates to a distance information obtaining device for use in obtaining distance information related to a distance between the device and an object having a bulk.

A distance information obtaining device of the type described, is disclosed in an article which is published by Johji Tajima, the instant applicant, under the title of "Rainbow Range Finder Principle for Range Data Acquisition" in "International Workshop on Industrial Application of Machine Vision and Machine Intelligence" held by IEEE in 1987, pages 381 to 386. The range finder is used as the distance information obtaining device.

Another distance information obtaining device of the type described, is disclosed in U.S. Pat. No. 4,864,395 issued to the instant applicant and assigned to the instant assignee.

In order to deal with the object by using, for example, a robot arm or magic hand, it is necessary to sense three dimensional distance information from an observation position or a predetermined position to each point on the object. A distance information obtaining device is for obtaining the distance information by using a picture signal of the object. The distance information obtaining device is also used in obtaining the distance information when the object is a human body.

The distance information obtaining device comprises an optical beam generator, such as a lamp, for generating an optical beam having a plurality of wavelength components. In other words, the optical beam is a white light or the daylight. Supplied with the optical beam, a diffraction grating illuminates the object by a monochromatic beam having a selected one of the wavelength components. Thus, the diffraction grating serves as an illuminating unit for illuminating the object by the monochromatic beam.

An image pickup device, such as a color television camera, is located at the observation or predetermined position. The image pickup device picks up an optical image of the object and produces a picture signal. Connected to the image pickup device, a processing unit processes the picture signal into a processed signal representative of the distance information in the manner which will later be described.

On obtaining the distance information by a conventional distance information obtaining device, it is necessary to prepare a special environment in which environment light of the object is cut off. In order to avoid preparing the special environment, the optical beam generator may be made to generate the optical beam having an intensity which is higher than that of the environment light of the object. When the object is a human body, illuminating the human body by the optical beam of high intensity for a long time has a harmful influence on the human body.

SUMMARY OF THE INVENTION

It is therefore an object of this invention to provide a distance information obtaining device which is capable of obtaining distance information without preparing a special environment in which environment light of an object is cut off.

It is another object of this invention to provide a distance information obtaining device of the type described, which is capable of obtaining distance information by instantaneously illuminating an object.

It is still another object of this invention to provide a distance information obtaining device of the type described, which is capable of obtaining distance information by instantaneously illuminating the object by an optical beam of high intensity.

It is a further object of this invention to provide a distance information obtaining device of the type described, which can avoid a harmful influence on the object when the object is a human body.

Other objects will become clear as the description proceeds.

A distance information obtaining device is for obtaining distance information related to a distance between a predetermined position and an object. The device includes optical beam generating means for generating an optical beam having a plurality of wavelength components, illuminating means supplied with said optical beam for illuminating the object by a monochromatic beam having a selected one of the wavelength components, image pickup means located at the predetermined position for picking up an optical image of the object to produce a picture signal, and processing means connected to the image pickup means for processing the picture signal into a processed signal representative of the distance information.

According to this invention, the above-described device comprises: activating means connected to the optical beam generating means and the image pickup means for simultaneously activating the optical beam generating means and the image pickup means for a predetermined time duration so that the optical beam generating means generates the optical beam while activated and so that the image pickup means picks up the optical image of the object while activated.

DESCRIPTION OF THE PREFERRED EMBODIMENTS

Figure 1:
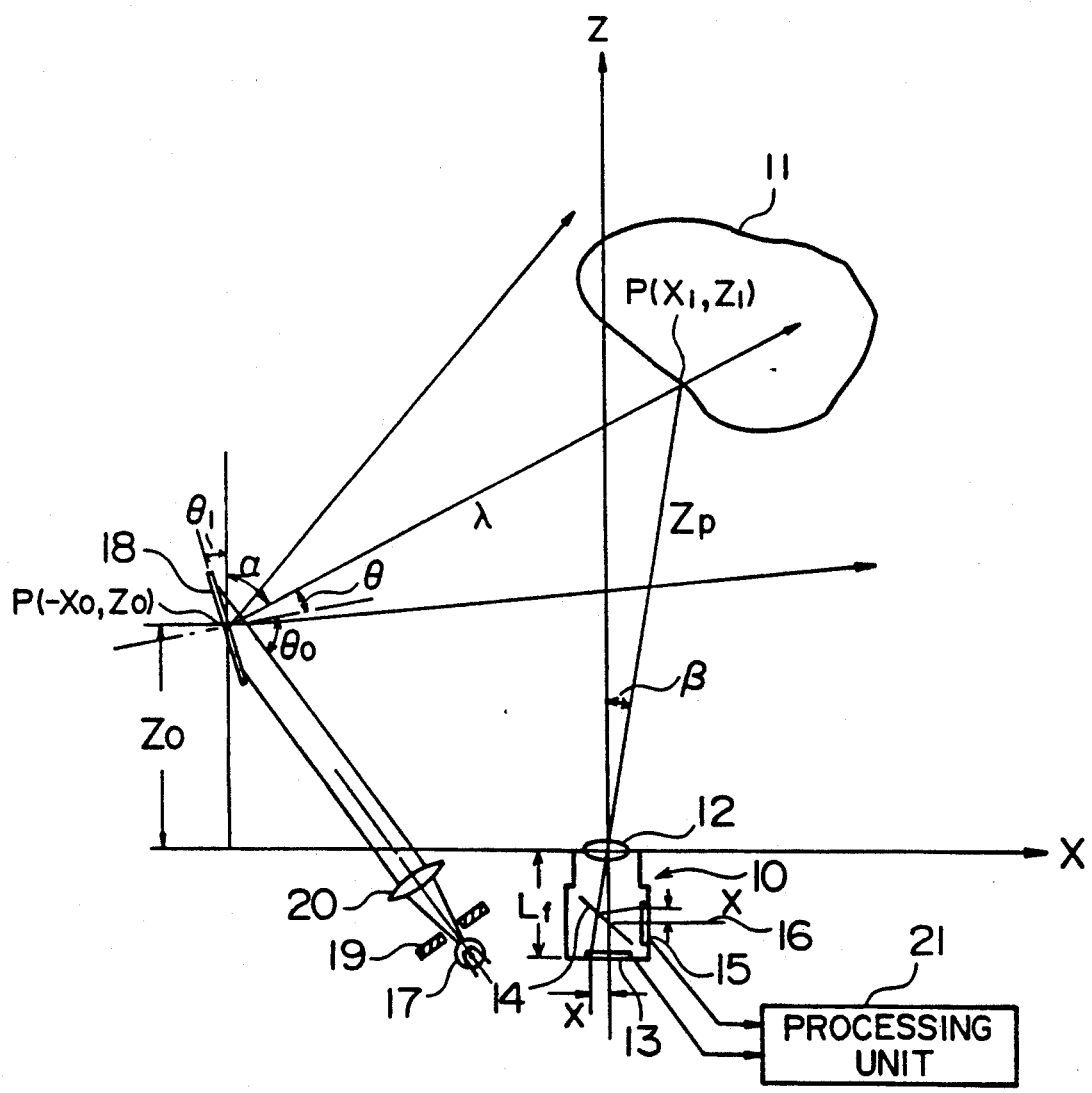
FIG. 1 is a schematic top view of a conventional distance information obtaining device.

Referring to FIG. 1, a conventional distance information obtaining device will be described at first in order to facilitate an understanding of this invention. The conventional distance information obtaining device is substantially equivalent to a distance information obtaining device disclosed in U.S. Pat. No. 4,864,395 referred to hereinabove.

The distance information obtaining device comprises, as an image pickup device, a television camera 10 having a pickup axis. An object has a position and is depicted at 11. The distance obtaining device is used in sensing a distance which will presently be more precisely defined between the television camera 10 and the object 11. Attention will be directed to a specific point P on the object 11.

On sensing the distance, the image pickup device 10 is directed towards the object 11. More specifically, a z-axis Z is selected in coincidence with the pickup axis. A coordinate plane is defined by the z-axis Z and the specific point P. The television camera 10 comprises a light receiving lens 12 at which an x-axis X is defined on the coordinate plane perpendicular to the z-axis Z. The axes X and Z define an origin at a center point of the light receiving lens 12. The specific point P has coordinates $(X_1, Z_1)$ and will be denoted by $P(X_1, Z_1)$.

The light receiving lens 12 has a focal length $L_f$. A first photoelectric transducer 13 is arranged perpendicular to the z-axis Z at a spacing of the focal length $L_f$ from the origin. A beam splitter 14 is located between the light receiving lens 12 and the first photoelectric transducer 13.

A second photoelectric transducer 15 is arranged parallel to the z-axis Z and perpendicular to the x-axis X. In other words, the second photoelectric transducer 15 is arranged perpendicular to a hypothetical line 16 which is parallel to the x-axis X and passes through a point of intersection between the z-axis Z and the beam splitter 14. An angle of 45° is formed between the beam splitter 14 and the hypothetical line 16. Each of the first and the second photoelectric transducers 13 and 15 is, for example, a charge-coupled image sensor.

Each of the first and the second photoelectric transducers 13 and 15 comprises a plurality of unit cells. The unit cells of the first photoelectric transducer 13 is linearly aligned parallel to the x-axis X. The unit cells of the second photoelectric transducer 15 is linearly aligned parallel to the z-axis Z. The unit cells of the first photoelectric transducer 13 correspond to the respective unit cells of the second photoelectric transducer 15 in the manner which will become clear as the description proceeds. The first and the second photoelectric transducers 13 and 15 have first and second spectral sensitivities $\sigma_1(\lambda)$ and $\sigma_2(\lambda)$ which are different from each other.

A lamp 17 generates an optical beam towards a diffraction grating 18 successively through a slit 19 and a collimator lens 20. The grating 18 has a center point having coordinates $(-X_0, Z_0)$ denoted by $P(-X_0, Z_0)$ and has a normal which is directed to the object 11 and depicted by a dash-dot line. The grating 18 therefore forms a grating angle $\theta_1$ with the z-axis Z and directs diffracted light to the object 11 with a spectral distribution so that each point of the object 11 is exposed to a monochromatic beam of a certain wavelength. The monochromatic beam of a specific wavelength $\lambda$ reaches the specific point $P(X_1, Z_1)$ forming a beam angle $\theta$ with the normal of the grating 18 and a first angle $\alpha$ with the z-axis Z.

Towards the television camera 10, the specific point $P(X_1, Z_1)$ reflects the monochromatic beam as a reflected beam which forms a second angle $\beta$ with the z-axis Z. In the television camera 10, the reflected beam falls on a specific unit cell of each of the first and the second photoelectric transducers 13 and 15. Supposing that the specific unit cell of the first photoelectric transducer 13 is positioned at a cell distance x from the z-axis Z, the specific unit cell of the second photoelectric transducer 15 is positioned at the cell distance x from the hypothetical line 16.

In the manner described above, it is necessary for the distance information obtaining device to sense the distance between the television camera 10 and the object 11. More exactly, the distance is between the origin and the specific point $P(X_1, Z_1)$ and will be noted by $Z_p$. The distance $Z_p$ has a z distance component $Z_1$ given by:

$$Z_1 = (X_0 - Z_0 \tan \alpha)/(\tan \beta - \tan \alpha), \quad (1)$$

where the first angle $\alpha$ is calculated by using the grating angle $\theta_1$ and the beam angle $\theta$. The second angle $\beta$ is calculated by using the cell distance x and the focal length $L_f$. The distance $Z_p$ has an x distance component $X_1$ given by:

$$X_1 = \tan \beta \cdot (X_0 - Z_0 \tan \alpha)/(\tan \beta - \tan \alpha). \quad (1)'$$

It is, however, necessary on calculating the first angle $\alpha$ to preliminarily calculate the beam angle $\theta$. In order to know the beam angle $\theta$, the specific wavelength $\lambda$ is searched at first by using the reflected beam. More specifically, the first and the second photoelectric transducers 13 and 15 produce first and second object picture signals of first and second levels $I_1$ and $I_2$ in response to the reflected beam. The first and the second levels $I_1$ and $I_2$ have a level rate R defined and given by:

$$R = I_1/(I_1 + I_2) \quad (2)$$
$$= \sigma_1(\lambda)/[\sigma_1(\lambda) + \sigma_2(\lambda)]. \quad (2)'$$

It is therefore possible to search the specific wavelength $\lambda$ by using the level rate R provided that each of the first and the second sensitivities $\sigma_1(\lambda)$ and $\sigma_2(\lambda)$ is a monotone function of the wavelength $\lambda$. For example, the first and the second spectral sensitivities $\sigma_1(\lambda)$ and $\sigma_2(\lambda)$ are monotonously increasing and monotonously decreasing functions, respectively. Each of the monotonously increasing and the monotonously decreasing functions is, for example, a linear function.

The beam angle $\theta$ is now calculated according to:

$$\sin \theta_0 - \sin \theta = \pm n\lambda/d, \quad (3)$$

where $\theta_0$ represents an angle of incidence of the optical beam on the grating 18, d represents a grating constant of the grating 18, and n represents a natural number which represents an order of diffraction and is usually equal to unity.

Connected to the first and the second photoelectric transducers 13 and 15, a processing unit 21 calculates the distance $Z_p$ by using the distances $X_1$ and $Z_1$ calculated by using the first and the second angles $\alpha$ and $\beta$ and the beam angle $\theta$ as a set of initial values. The beam angle $\theta$ is obtained by using two optical images which the specific point P ($X_1$, $Z_1$) produces on the first and the second photoelectric transducers 13 and 15. The processing unit 21 calculates distances for various other points on the object 11.

Figure 2:
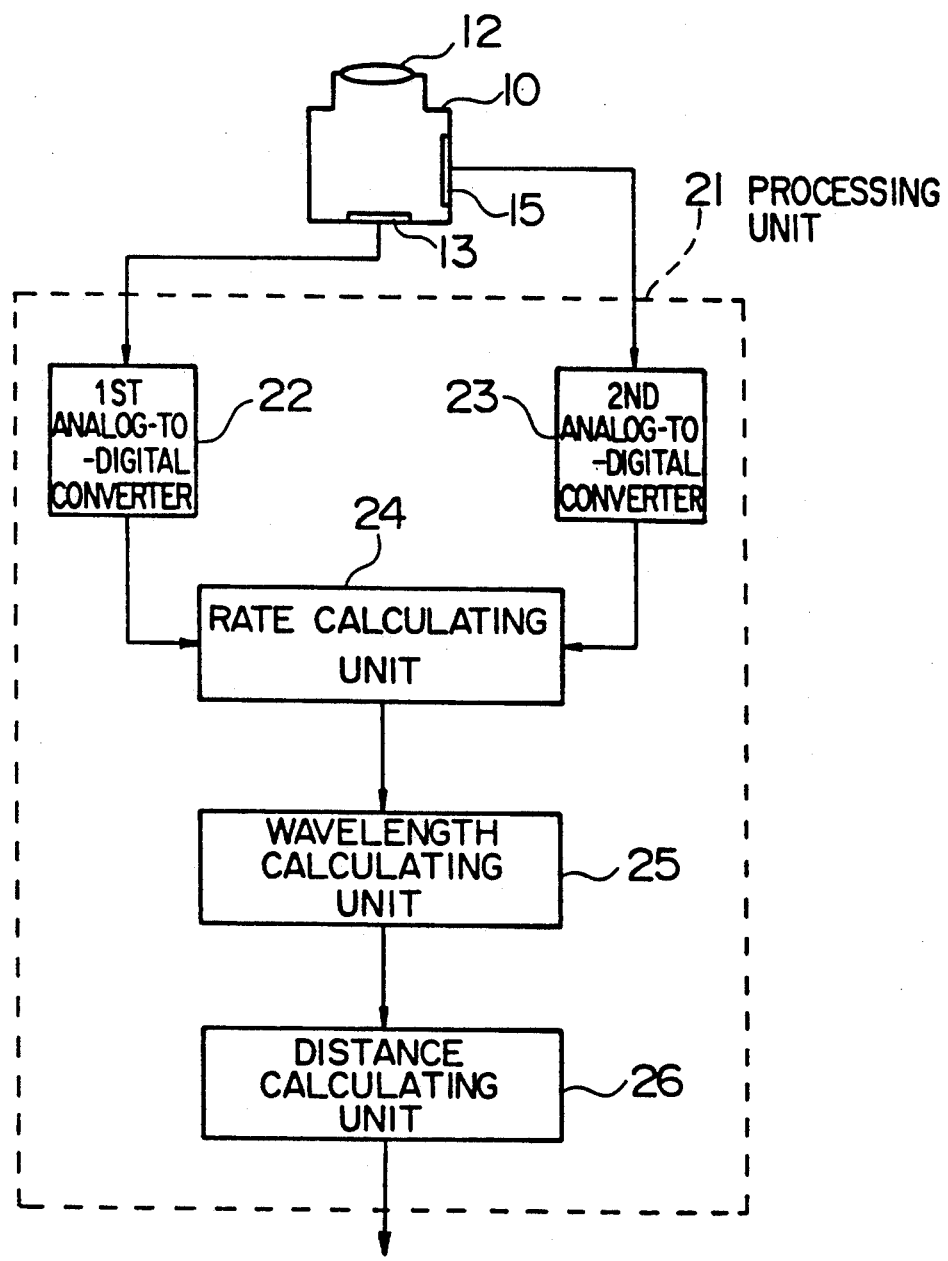
FIG. 2 shows in blocks, together with a television camera, a processing unit which is used in the distance information obtaining device illustrated in FIG. 1 and is for use in embodiments of the present invention.

Turning to FIG. 2, the processing unit 21 comprises first and second analog-to-digital converters 22 and 23 connected to the first and the second photoelectric transducers 13 and 15, respectively. The first and the second analog-to-digital converters 22 and 23 are for converting the first and the second object picture signals having the first and the second levels $I_1$ and $I_2$ into first and second digital signals, respectively.

A rate calculating unit 24 is connected to the first and the second analog-to-digital converters 22 and 23. Responsive to the first and the second digital signals, the rate calculating unit 24 calculates the level rate R in accordance with Equation (2) and produces a level rate signal representative of the level rate R.

A wavelength calculating unit 25 is connected to the rate calculating unit 24. Responsive to the level rate signal, the wavelength calculating unit 25 calculates the specific wavelength $\lambda$ in accordance with Equation (2)'. More specifically, the wavelength calculating unit 25 searches the specific wavelength $\lambda$ by using the level rate R provided that each of the first and the second sensitivities $\sigma_1(\lambda)$ and $\sigma_2(\lambda)$ is a monotone function of the wavelength $\lambda$ as described above. The wavelength calculating unit 25 thereby produces a specific wavelength signal representative of the specific wavelength $\lambda$.

A distance calculating unit 26 is connected to the wavelength calculating unit 25. Responsive to the specific wavelength signal, the distance calculating unit 26 calculates the beam angle $\theta$ in compliance with Equation (3) by the use of the specific wavelength $\lambda$ and calculates the distance $Z_p$ in accordance with Equations (1) and (1)'. The distance calculating unit 26 thereby produces a distance signal as a processed signal representative of the distance information related to the distance $Z_p$.

Turning back to FIG. 1 and with reference to FIG. 2 continued, operation of the distance information obtaining device will be summarized. The lamp 17 serves in combination with the slit 19 and the collimator lens 20 as an optical beam generator which generates the optical beam having a plurality of wavelength components. Supplied with the optical beam, the diffraction grating 18 serves as an illuminating unit for illuminating the object 11 by the monochromatic beam having a selected one of the wavelength components.

The television camera 10 serves as the image pickup device which is located at the predetermined position. The image pickup device picks up an optical image of the object 11 and produces a picture signal. Connected to the image pickup device, the processing unit 21 processes the picture signal into the processed signal representative of the distance information related to the distance $Z_p$ between the predetermined position and the object 11.

The illuminating unit (namely, the diffraction grating 18) is located at a predetermined distance from the predetermined position. The image pickup device comprises the first and the second photoelectric transducers 13 and 15, each comprising a plurality of the unit cells. The unit cells of the first photoelectric transducer 13 correspond to the respective unit cells of the second photoelectric transducer 15. Each of the unit cells of the first photoelectric transducer 13 has a first spectral sensitivity. Each of the unit cells of the second photoelectric transducer 15 has a second spectral sensitivity which is different from the first spectral sensitivity. A particular set of corresponding unit cells of the first and the second photoelectric transducers 13 and 15 is for transducing the optical image into first and second object picture signals with a level rate to produce the first and the second object picture signals collectively as the picture signal. The processing unit 21 processes the first and the second object picture signals into the processed signal by using the level rate and the predetermined distance.

On practically measuring the distance $Z_p$ by the conventional distance information obtaining device, a special environment should be prepared in order to cut off environment light of the object 11 in the manner described hereinabove. Alternatively, the optical beam generator may be made to generate the optical beam having an intensity which is higher than that of the environment light of the object 11. When the object 11 is a human body, illuminating the human body by the optical beam of high intensity for a long time has a harmful influence on the human body as also mentioned in the preamble of the instant specification.

Figure 3:
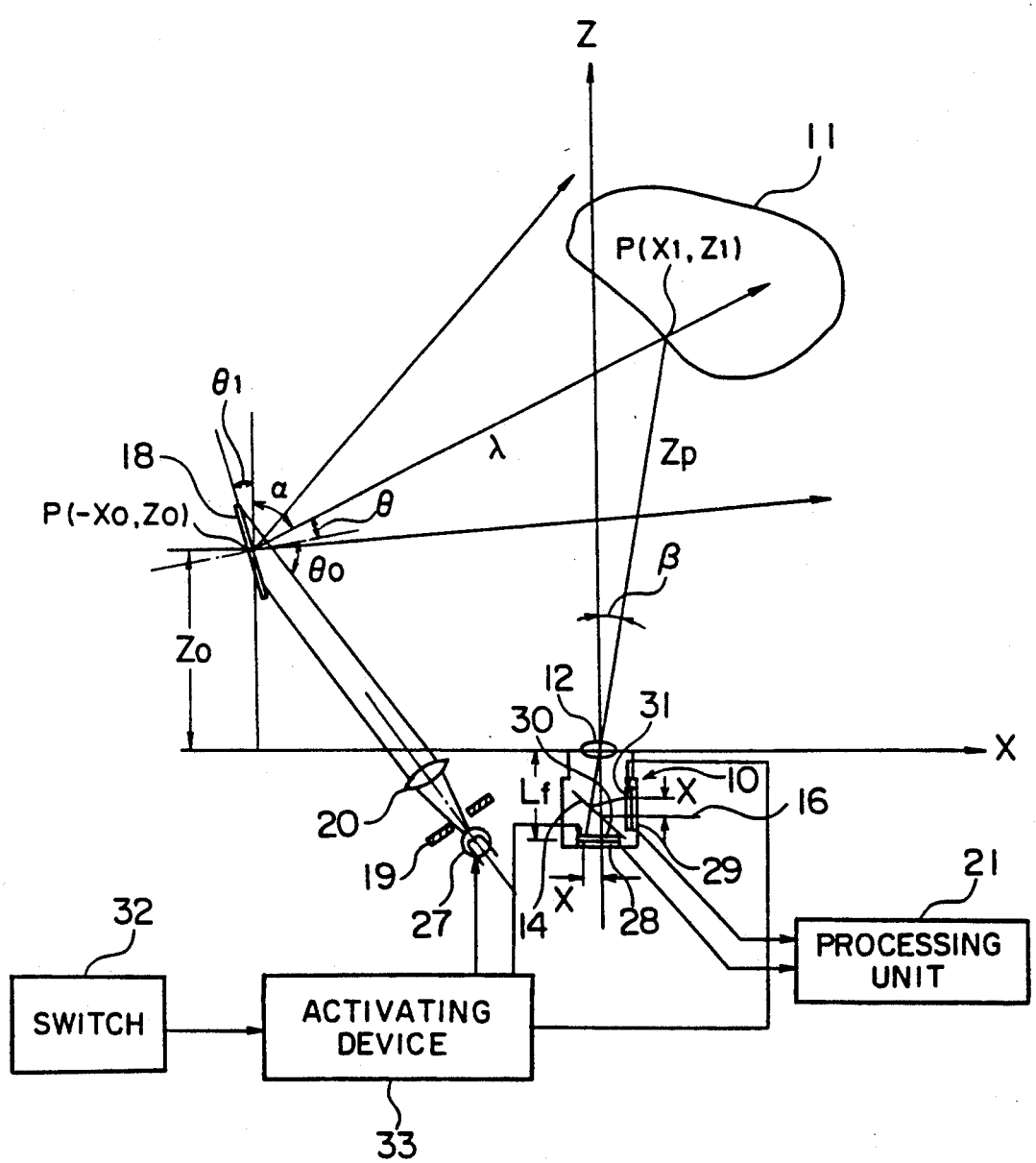
FIG. 3 is a schematic top view of a distance information obtaining device according to a first embodiment of this invention.

Turning to FIG. 3, a distance information obtaining device according to a first embodiment of this invention comprises similar parts designated by like reference numerals. The distance information obtaining device comprises a flash light source 27 as the optical beam generator. The flash light source 27 generates a flash light as the optical beam. The flash light has an intensity which is higher than that of the environment of the object 11.

Each of first and second photoelectric transducers 28 and 29 comprises the unit cells like in the first and the second photoelectric transducers 13 and 15. The first and the second photoelectric transducers 28 and 29 further comprise first and second electric shutters 30 and 31 formed on the unit cells of the first and the second photoelectric transducers 28 and 29. Each of the first and the second photoelectric transducers 28 and 29 is, for example, a charge-coupled image sensor with the electronic shutter 30 or 31.

A start switch 32 is for producing a start signal. An activating device 33 is connected to the flash light source 27 and the first and the second electronic shutters 30 and 31 of the first and the second photoelectric transducers 28 and 29. Responsive to the start signal, the activating device 33 simultaneously activates the flash light source 27 and the first and the second electronic shutters 30 and 31 a predetermined time duration so that the flash light source 27 generates the flash light while activated and that the first and the second electronic shutters 30 and 31 supply the optical image of the object 11 to the unit cells of the first and the second photoelectric transducers 28 and 29 while activated. As a result, the first and the second photoelectric transducers 28 and 29 transduce the optical image of the object 11 into the first and the second object picture signals while activated. In other words, the image pickup device (namely, the television camera 10) picks up the optical image of the object 11 while activated. When the first and the second electronic shutters 30 and 31 are not activated, the first and the second electronic shutters 30 and 31 cut off the optical image of the object 11.

The predetermined time duration is an instantaneous time duration which is selected between 1/1000 and 1/500 seconds.

Figure 4:
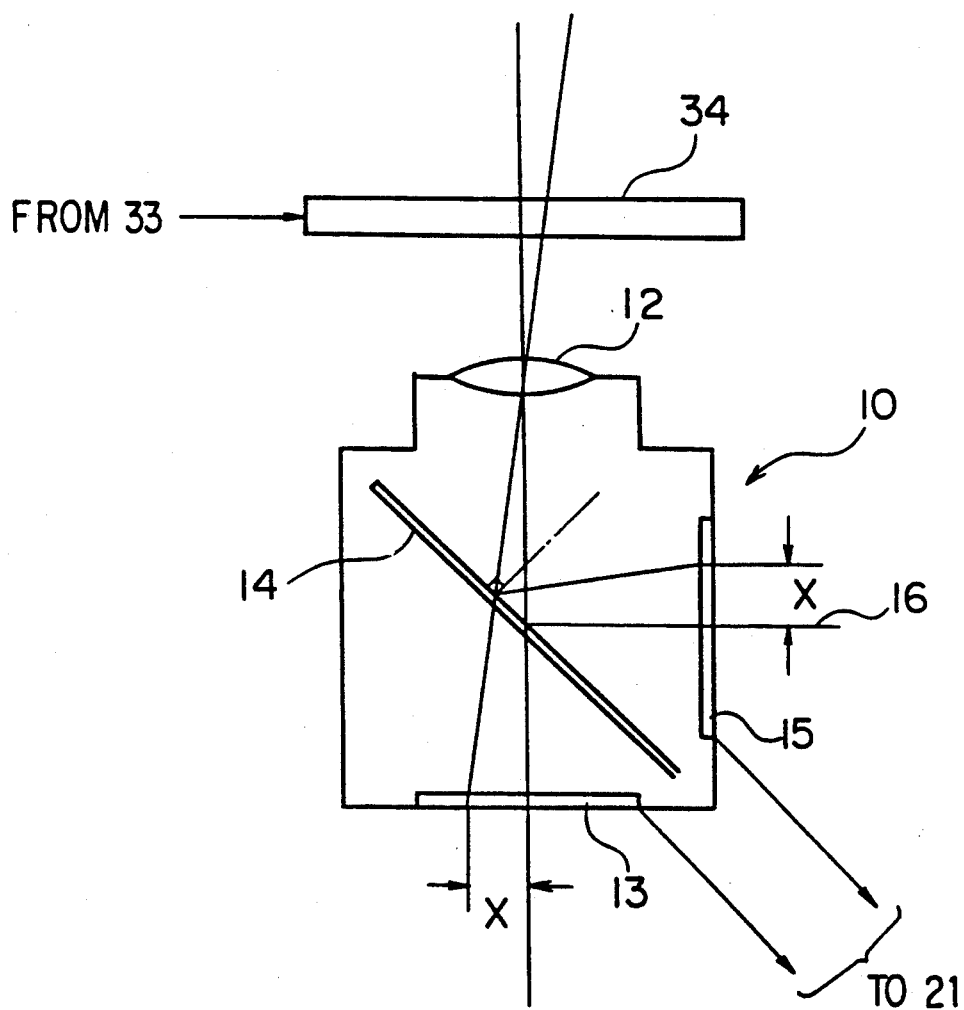
FIG. 4 is a schematic partial top view of a distance information obtaining device according to a second embodiment of this invention.

Turning to FIG. 4, a distance information obtaining device according to a second embodiment of this invention comprises similar parts designated by like reference numerals. In the example being illustrated, the image pickup device comprises the television camera 10 of the type illustrated in FIG. 1 and a pickup shutter 34 connected to the activating device 33. The pickup shutter 34 supplies the optical image of the object 11 (FIG. 3) to the first and the second photoelectric transducers 13 and 15 of the television camera 10 when the pickup shutter 34 is activated. The pickup shutter 34 cuts off the optical image of the object 11 when the pickup shutter 34 is not activated.

Figure 5:
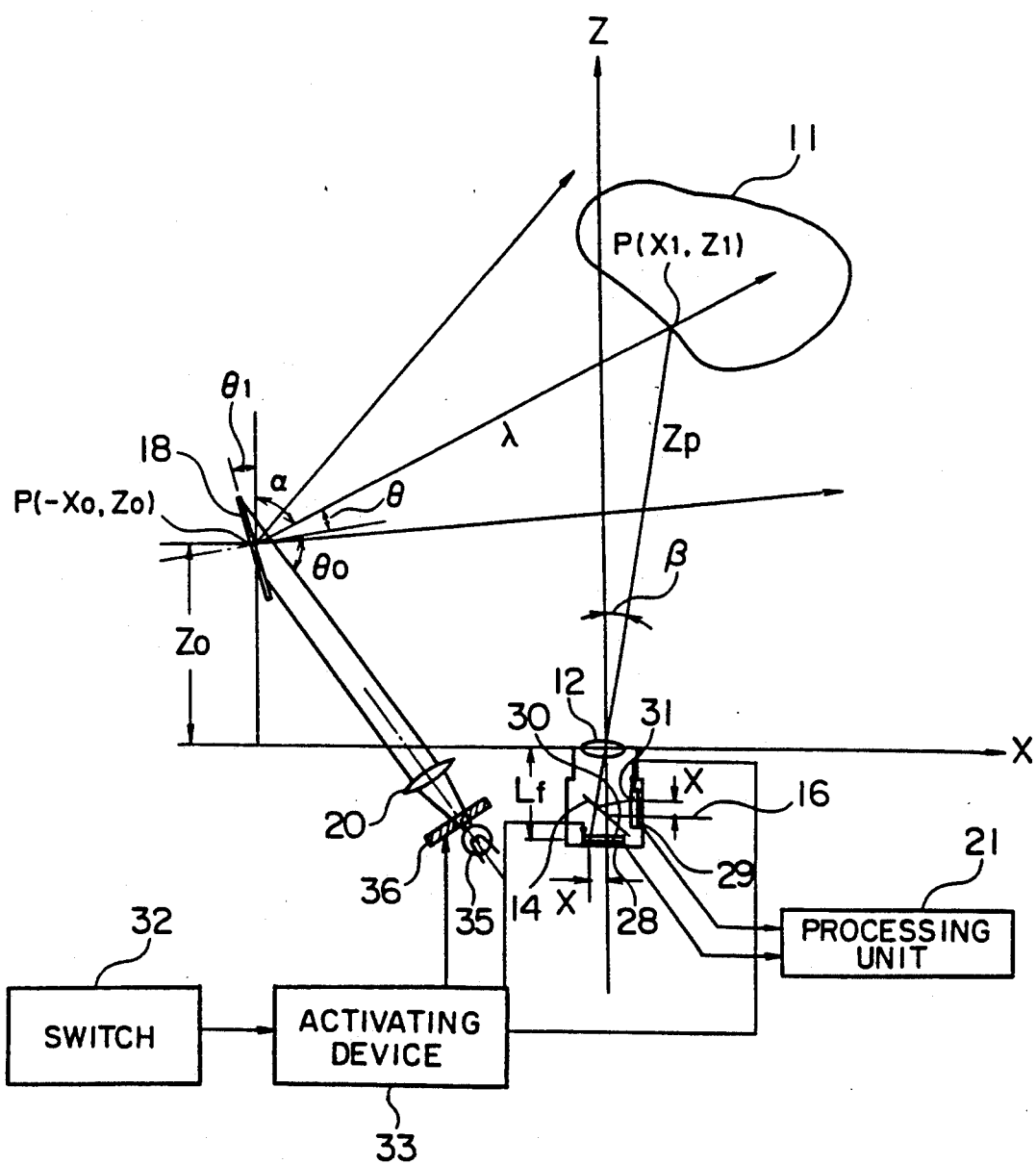
FIG. 5 is a schematic top view of a distance information obtaining device according to a third embodiment of this invention.

Turning to FIG. 5, the optical beam generator comprises a white or daylight light source 35, a light source shutter 36, and the collimator lens 20. The white light source 35 generates a white light or daylight as the optical beam. The light source shutter 36 is connected to the activating device 33 and supplies the white light to the illuminating unit (namely, the diffraction grating 18) when the light source shutter 36 is activated. When the light source shutter 36 is not activated, the light source shutter 36 cuts off the white light.

Figure 6:
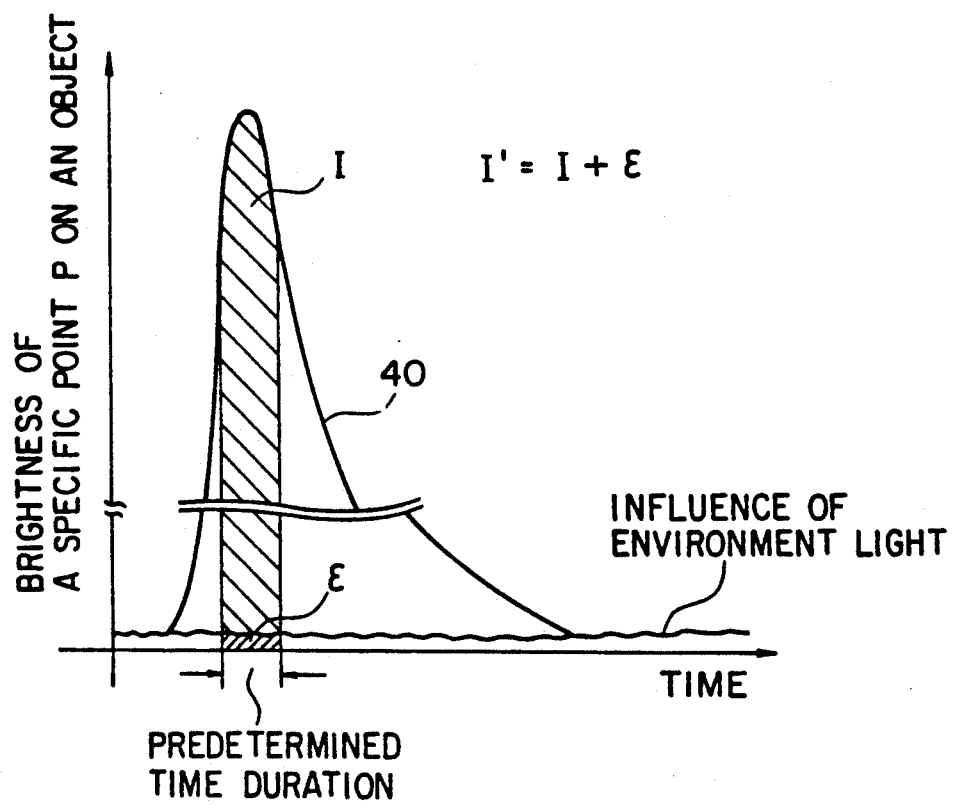
FIG. 6 is a graph for use in describing operation of the distance information obtaining devices illustrated in FIGS. 3 and 5.

Turning to FIG. 6, description will be made more in detail as regards operation of the activating device 33 of each of the distance obtaining devices illustrated in FIGS. 3 and 5. According to this invention, it is possible to measure the distance $z_p$ with a measurement error which is substantially equal to the level rate. This is rendered possible by preliminarily determining the predetermined time duration so that influence of the environment light of the object 11 can be neglected. When brightness of the specific point P of the object 11 is graphically represented in FIG. 6 by a curve 40, another level rate R' is defined by first and second levels $I'_1$ and $I'_2$ of the first and the second object picture signals produced by the first and the second photoelectric transducers 28 and 29. The level rate R' is given by:

$$R' = I_1'/(I_1' + I_2') \quad (4)$$
$$= (I_1 + \epsilon_1)/(I_1 + \epsilon_1 + I_2 + \epsilon_2)$$
$$\approx I_1/(I_1 + I_2) + (-I_1\epsilon_2 + I_2\epsilon_1)/(I_1 + I_2)^2,$$

where $I_1$ and $I_2$ represent the first and the second levels, respectively, when the environment light is cut off by using the special environment and where $\epsilon_1$ and $\epsilon_2$ represent first and second environment levels given by the first and the second photoelectric transducers 28 and 29, respectively, when the object 11 is illuminated only by the environment light. It is assumed that $\epsilon_1$ and $\epsilon_2$ are negligible relative to $I_1$ and $I_2$.

Attention will be directed to the second term $(-I_1\epsilon_2 + I_2\epsilon_1)/(I_1 + I_2)^2$ on the right-hand side of Equation (4). The second term has an absolute value which becomes largest either when $I_1$ becomes equal to zero (that is, when the second term becomes equal to $\epsilon_1/I_2$) or when $I_2$ becomes equal to zero (that is, when the second term becomes equal to $\epsilon_2/I_1$). Supposing that one of the first and the second photoelectric transducers 28 and 29 is supplied with a primary quantity of light due to the monochromatic beam and that the other of the first and the second photoelectric transducers 28 and 29 is supplied with a secondary quantity of light due to the environment light and that the secondary quantity is k percent of the primary quantity, the level rate R' may have an error which is equal to at most k percent. Further supposing that the first and the second sensitivities $\sigma_1(\lambda)$ and $\sigma_2(\lambda)$ is a linear function as mentioned above, the first angle $\alpha$ obtained by the first and the second sensitivities $\sigma_1(\lambda)$ and $\sigma_2(\lambda)$ may have another error of at most k percent. As a result, the measurement error is obtained by:

$$dz \approx \frac{Z - Z_0}{(\tan\beta - \tan\alpha)\cos^2\alpha} \, d\alpha. \quad (5)$$

Presuming in Equation (5) that a value $(-z_0)$ is negligible by locating the diffraction grating 18 near the x-axis X, the measurement error dz of Equation (5) is m times as small as the distance $z_1$ of Equation (1), where m is given by:

$$m = \frac{d\alpha}{(\tan\beta - \tan\alpha)\cos^2\alpha}, \quad (6)$$

and is very small.

Further presuming that the diffraction grating 18, the object 11, and the television camera 10 are located at positions so that a specific value $(\tan\beta - \tan\alpha)\cos^2\alpha$ of Equation (6) is approximately equal to unity, the measurement error may be at most k percent. At any rate, the distance $Z_p$ can be measured at the measurement error of k percent or less.

What is claimed is:

1. A distance information obtaining device for obtaining distance information related to a distance between a predetermined position and an object, said distance information obtaining device comprising:

optical beam generating means for generating an optical beam having a plurality of wavelength components, illuminating means for illuminating said object with a monochromatic beam having a selected one of said wavelength components, image pickup means located at said predetermined position for picking up an optical image of said object to produce a picture signal.

processing means, connected to said image pickup means, for processing said picture signal into a processed signal representative of said distance information, and activating means, connected to said optical beam generating means and to said image pickup means, for simultaneously activating said optical beam generating means and said image pickup means for a predetermined time duration such that said optical beam generating means generates said optical beam while activated and such that said image pickup means picks up the optical image of said object while activated, said optical beam generating means generating said optical beam at an intensity that is higher than that of environmental light in the vicinity of said object, said predetermined time duration being selected so that said environmental light appears in said optical image as a component which is not greater than k percent of said optical image, k being less than 100, where k represents a predetermined percentage allowed for an error in said distance information, said illuminating means being located at a predetermined distance from said predetermined position, said image pickup means comprising first and second transducing means each comprising a plurality of unit cells, the unit cells of said first transducing means corresponding to the respective unit cells of said second transducing means, each of the unit cells of said first transducing means having a first spectral sensitivity, each of the unit cells of said second transducing means having a second spectral sensitivity which is different from said first spectral sensitivity, a particular one of the unit cells of said first transducing means and a corresponding one of the unit cells of said second transducing means transducing said optical image into first and second object picture signals with a level rate to produce said first and said second object picture signals collectively as said picture signal, said processing means processing said first and said second object picture signals into said processing signal using said level rate and said predetermined distance, wherein said activating means is connected to said optical beam generating means and said first and said second transducing means for simultaneously activating said optical beam generating means and said first and said second transducing means for said predetermined duration so that said optical beam generating means generates said optical beam while activated and so that said first and said second transducing means transduce the optical image of said object into said first and said second object picture signals while activated.

2. A distance information obtaining device as claimed in claim 1, wherein said first and said second transducing means further comprise first and second electronic shutter means formed on unit cells of said first and said second transducing means and connected to said activating means, respectively, said first and said second electronic shutter means supplying the optical image of said object to unit cells of said first and said second transducing means when said first and said second electronic shutter means are activated, said first and said second electronic shutter means cutting off the optical image of said object when said first and said second electronic shutter means are not activated.

3. A distance information obtaining device as claimed in claim 1, wherein said illuminating means is a flash light source.

4. A distance information obtaining device as claimed in claim 1, wherein said illuminating means is a white light source.

5. A method for obtaining information related to the distance between a predetermined position and an object, comprising:
  (a) arranging a first transducer with a first spectral sensitivity to the object parallel to a z-axis of a pickup axis;
  (b) arranging a second transducer with a second spectral sensitivity parallel to the z-axis and perpendicular to the x-axis;
  (c) generating an optical beam with a spectral distribution toward the object and exposing the object to a monochromatic beam of a predetermined wavelength for a predetermined time duration;
  (d) activating the first and second transducers to pickup the optical image while the optical beam is generated;
  (e) producing first and second picture signals of first and second levels responsive to the optical image, while the transducers are activated;
  (f) calculating the beam angle; and
  (g) calculating the distance with an error of not more than k percent, said k percent being less than 100 percent.

6. A method for obtaining information related to the distance between a predetermined position and an object, comprising:
  (a) arranging a first transducer with a first spectral sensitivity to the object parallel to a z-axis of a pickup axis;
  (b) arranging a second transducer with a second spectral sensitivity parallel to the z-axis and perpendicular to the x-axis;
  (c) generating an optical beam with a spectral distribution toward the object and exposing the object to a monochromatic beam of a predetermined wavelength for a predetermined time duration;
  (d) activating the first and second transducers to pickup the optical image while the optical beam is generated;
  (e) producing first and second picture signals of first and second levels responsive to the optical image, while the transducers are activated;
  (f) calculating the beam angle; and
  (g) calculating the distance with an error of not more than k percent, said k percent being less than 100 percent;

wherein the activating step comprises supplying the first transducer with first quantity of light, supplying the second transducer with a second quantity of light being said k percent of the first quantity, and activating shutters on the transducers.

* * * * *